United States Patent
Watanabe et al.

(10) Patent No.: US 12,146,212 B2
(45) Date of Patent: Nov. 19, 2024

(54) GRAIN-ORIENTED ELECTRICAL STEEL SHEET AND METHOD FOR PRODUCING SAME

(71) Applicant: JFE Steel Corporation, Tokyo (JP)

(72) Inventors: Makoto Watanabe, Tokyo (JP); Hidemasa Kodama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 840 days.

(21) Appl. No.: 17/278,886

(22) PCT Filed: Sep. 25, 2019

(86) PCT No.: PCT/JP2019/037543
§ 371 (c)(1),
(2) Date: Mar. 23, 2021

(87) PCT Pub. No.: WO2020/067136
PCT Pub. Date: Apr. 2, 2020

(65) Prior Publication Data
US 2022/0042153 A1 Feb. 10, 2022

(30) Foreign Application Priority Data
Sep. 27, 2018 (JP) .................. 2018-182219

(51) Int. Cl.
| | | |
|---|---|---|
| C22C 38/60 | (2006.01) | |
| C21D 8/02 | (2006.01) | |
| C21D 9/46 | (2006.01) | |
| C22C 38/00 | (2006.01) | |
| C22C 38/02 | (2006.01) | |
| C22C 38/04 | (2006.01) | |

(52) U.S. Cl.
CPC ............ *C22C 38/60* (2013.01); *C21D 8/0205* (2013.01); *C21D 8/0226* (2013.01); *C21D 8/0236* (2013.01); *C21D 9/46* (2013.01); *C22C 38/001* (2013.01); *C22C 38/02* (2013.01); *C22C 38/04* (2013.01)

(58) Field of Classification Search
CPC ....... C22C 38/60; C22C 38/001; C22C 38/02; C22C 38/04; C22C 38/06; C22C 38/00; C21D 8/0205; C21D 8/0226; C21D 8/0236; C21D 9/46; C21D 6/008; C21D 2201/05; C21D 1/26; C21D 1/76; C21D 3/04; C21D 8/1277; C21D 8/1283; C21D 8/1288; C21D 8/1272; C21D 8/12; C21D 8/1255; C21D 8/1222; C21D 8/1233; C21D 8/1261; H01F 1/14775; H01F 1/16; H01F 1/147; C23C 24/08; Y02P 10/20

See application file for complete search history.

(56) References Cited

U.S. PATENT DOCUMENTS

| | | |
|---|---|---|
| 4,897,131 A | 1/1990 | Wada et al. |
| 5,028,279 A | 7/1991 | Wada et al. |
| 2008/0190520 A1* | 8/2008 | Watanabe ............... C23C 22/74 148/320 |
| 2015/0013850 A1 | 1/2015 | Mamura et al. |
| 2015/0187473 A1 | 7/2015 | Imamura et al. |
| 2016/0319390 A1 | 11/2016 | Imamura et al. |

FOREIGN PATENT DOCUMENTS

| | | |
|---|---|---|
| CA | 3046434 A1 | 6/2018 |
| CN | 104471085 A | 3/2015 |
| CN | 108359896 A | 8/2018 |
| EP | 2602346 A1 | 6/2013 |
| EP | 2765219 A1 | 8/2014 |
| EP | 3225704 A1 | 10/2017 |
| EP | 3257960 A1 | 12/2017 |
| EP | 3321388 A1 | 5/2018 |
| JP | 6396216 A | 4/1988 |
| JP | 08209248 A | 8/1996 |
| JP | 09003541 A | 1/1997 |
| JP | 09111346 A | 4/1997 |
| JP | 2000239736 A | 9/2000 |
| JP | 2001303137 A | 10/2001 |
| JP | 2007138199 A | 6/2007 |

(Continued)

OTHER PUBLICATIONS

Chinese Office Action with Search Report for Chinese Application No. 201980061199.X, dated Mar. 25, 2022, 11 pages.
International Search Report and Written Opinion for International Application No. PCT/JP2019/037543, dated Dec. 17, 2019, 5 pages.
Russian Office Action for Russian Application No. 2021110970, issued Oct. 15, 2021, 15 pages.
Extended Eurpean Search Report for European Application No. 19867794.0, dated Jun. 28, 2021. 14 pages.

(Continued)

*Primary Examiner* — Anthony M Liang
*Assistant Examiner* — Danny N Kang
(74) *Attorney, Agent, or Firm* — Buchanan, Ingersoll & Rooney PC

(57) ABSTRACT

When a steel material is processed to produce a grain-oriented electrical steel sheet, conditions of a decarburization annealing process and conditions of a process before the decarburization annealing are adjusted so that a difference in concentration of O, Si, Al, Mn and P between the front and back surfaces of the steel sheet after the decarburization annealing is within a given range with respect to an average concentration between the front and back surfaces, and hence the difference in concentration of each of O, Si and Mg between the front and back surfaces of the product sheet is within ±5%, the difference in concentration of one or more of Al, Mn and P between the front and back surfaces is within ±15% and the difference in the concentration of one or more of Ca and Ti between the front and back surfaces is within ±20%.

1 Claim, No Drawings

(56) References Cited

FOREIGN PATENT DOCUMENTS

| | | | |
|---|---|---|---|
| JP | 2007169755 A | | 7/2007 |
| JP | 2008031499 A | | 2/2008 |
| JP | 2010156006 A | | 7/2010 |
| JP | 2017122247 A | * | 7/2012 |
| JP | 2014167147 A | | 9/2014 |
| JP | 2014196559 A | | 10/2014 |
| JP | 2015098637 A | | 5/2015 |
| JP | 2016086437 A | | 5/2015 |
| JP | 2016196669 A | | 11/2016 |
| JP | 2017133080 A | | 8/2017 |
| JP | 2018066035 A | | 4/2018 |
| KR | 20130026243 A | | 3/2013 |
| RU | 2571672 C1 | | 12/2015 |

OTHER PUBLICATIONS

European Communication pursuant to Article 94(3) for European Application No. 19867794.0, dated Jan. 4, 2023, 5 pages.
Korean Request for the Submission of an Opinion for Korean Application No. 10-2021-7007151, dated Sep. 27, 2022, with translation, 6 pages.

* cited by examiner

GRAIN-ORIENTED ELECTRICAL STEEL SHEET AND METHOD FOR PRODUCING SAME

CROSS REFERENCE TO RELATED APPLICATIONS

This is the U.S. National Phase application of PCT/JP2019/037543, filed Sep. 25, 2019, which claims priority to Japanese Patent Application No. 2018-182219, filed Sep. 27, 2018, the disclosures of these applications being incorporated herein by reference in their entireties for all purposes.

FIELD OF THE INVENTION

This invention relates to a grain-oriented electrical steel sheet and a method for producing the same, concretely to a grain-oriented electrical steel sheet being excellent in the properties of a ceramic underlaying coating composed mainly of forsterite, spinel and the like in longitudinal and widthwise directions of a coil, particularly coating adhesiveness and a method for producing the same. The ceramic underlaying coating composed mainly of forsterite, spinel and the like is hereinafter referred to simply as "forsterite coating".

BACKGROUND OF THE INVENTION

An electrical steel sheet is a soft magnetic material widely used as a material for an iron core or the like of transformer and a motor. In particular, as being excellent in the magnetic properties because the crystal orientation is highly aligned into {110}<001> orientation called as Goss orientation, a grain-oriented electrical steel sheet is mainly used in an iron core or the like for a large-size transformer.

The grain-oriented electrical steel sheet is usually produced by hot rolling and cold rolling a steel material containing a large amount of Si to obtain a cold-rolled sheet, subjecting the cold-rolled sheet to decarburization annealing, applying an annealing separator composed mainly of MgO thereto, and performing a finish annealing. The high alignment into Goss orientation is attained by holding the steel sheet at a high temperature of not lower than 800° C. for a long time in the finish annealing to cause secondary recrystallization. Also, the sheet is heated to a high temperature of about 1200° C. after the secondary recrystallization in the finish annealing, whereby impurities in steel are discharged and an oxide film formed in the decarburization annealing process is reacted with the annealing separator, which is composed mainly of MgO, to form an underlaying coating composed mainly of forsterite. The underlaying coating has an effect of imparting tension to the steel sheet to reduce the iron loss and also has a function as a binder for an insulating coating to be formed later, contributing to improvement of insulation properties and corrosion resistance.

In the finish annealing, however, the steel sheet is wound into a coil and held at the high temperature for the long time at an up-end state, so that temperature is made non-uniform in the coil, causing such a problem the magnetic properties and the coating properties differ in the longitudinal and widthwise directions of the coil. In particularly, both outer edge portion of the top and bottom sides of the coil, which are in an up-end state, are overheated during the finish annealing to cause such troubles that the underlaying coating is stripped or point-like defects are caused, leading a decrease in product yield.

In order to solve the above problems, there have been proposed various techniques for devising the finish annealing conditions to improve the magnetic properties and the coating properties. For example, Patent Literature 1 proposes a method of promoting purification of N in steel, by repeatedly increasing and decreasing a furnace pressure in a particular temperature range during finish annealing. Patent Literature 2 proposes a method for improving a coil shape by using MgO with restricted angle of repose and bulk height as an annealing separator and also optimizing a winding tension of the coil after the application of the annealing separator. Furthermore, Patent Literature 3 proposes a method for suppressing deterioration in the magnetic properties and coting properties, by using a sealing material of specified particle size in a lower end portion of an inner cover when finish annealing is conducted in a hearth rotary type box furnace. Patent Literature 4 and Patent Literature 5 propose a method for increasing tension applied to the underlaying coating, by adding Bi to a steel sheet and increasing a flow rate of an atmosphere gas in the finish annealing.

PATENT LITERATURE

Patent Literature 1: JP-A-2000-239736
Patent Literature 2: JP-A-2001-303137
Patent Literature 3: JP-A-H08-209248
Patent Literature 4: JP-A-H09-003541
Patent Literature 5: JP-A-H09-111346

SUMMARY OF THE INVENTION

In the method of Patent Literature 1, however, negative pressure is locally generated in the annealing furnace when the pressure is decreased, and hence air may flow into the furnace to deteriorate the coating properties. In the method of Patent Literature 2, the coil shape is improved to some extent, but the coil is tightened by enhancing the winding tension to cause stagnation of the air flow between layers (steel sheets), whereby the magnetic properties and coating properties may be deteriorated. Moreover, in the method of Patent Literature 3 of limiting the particle size of the sealing material to the specified size and in the method of Patent Literatures 4 and 5 of increasing the gas flow rate, the improvement of the magnetic properties and the coating properties are limited and there is a problem that the sufficient improving effect cannot be obtained.

Although the coating properties and magnetic properties have been gradually improved by applying the prior arts, it cannot be said sufficient enough to meet the recent severe demand for quality, and particularly, further improvement is required in the defect of the underlaying coating properties generated in the upper portion and lower portion of the coil (both widthwise end portions of the coil) as well as the inner portion and outer portion of the coil (both longitudinal end portions of the coil) in the finish annealing.

Aspects of the invention are made in consideration of the above problems inherent to the prior arts, and an object thereof is to provide a grain-oriented electrical steel sheet having good coating properties even in portions where the properties of the forsterite-based underlaying coating, such as the upper and lower portions of the coil and the inner and outer portions of the coil in the finish annealing, are likely to be deteriorated, and propose a method for advantageously producing the grain-oriented electrical steel sheet.

The inventors have made various studies for solving the above task, and found out the following findings. The differences in concentrations of O, Si, Al, Mn and P between the front and back surfaces of the steel sheet after a decarburization annealing have a large influence on the quality of coating properties of a product sheet. Therefore, in order to obtain good coating properties, it is effective to optimize at least the decarburization annealing conditions, reduce the differences in the concentrations of O, Si, Al, Mn and P between the front and back surfaces of the steel sheet after the decarburization annealing, and consequently reduce the differences in concentrations of O, Si, Mg, Al, Mn, P, Ca and Ti between the front and back surfaces of the steel sheet as a product sheet to not more than a given value. Thus, aspects of the invention have been accomplished.

That is, aspects of the invention include a grain-oriented electrical steel sheet having a ceramic underlaying coating on the steel sheet surface, characterized in that differences in concentrations of O, Si, Mg, Al, Mn, P, Ca and Ti between the front and back surfaces of the underlaying coating satisfy the following conditions (1), (2) and (3) with respect to each average concentration between the front and back surfaces:

(1) each of O, Si and Mg: within ±5%,
(2) one or more of Al, Mn and P: within ±15%,
(3) one or more of Ca and Ti: within ±20%.

Also, aspects of the invention include a method for producing a grain-oriented electrical steel sheet comprising:
hot rolling a steel material for a grain-oriented electrical steel sheet to form a hot-rolled sheet,
after a hot-band annealing or without a hot-band annealing, subjecting the hot-rolled sheet to one cold rolling or two or more cold rollings having an intermediate annealing interposed therebetween to form a cold-rolled sheet having a final sheet thickness,
subjecting the cold-rolled sheet to a decarburization annealing combined with a primary recrystallization annealing,
applying an annealing separator composed mainly of MgO,
subjecting the cold-rolled sheet to a finish annealing followed by removal of an unreacted annealing separator, and
conducting one or more processes selected from flattening annealing, formation of an insulation coating and magnetic domain subdividing treatment to form a product sheet, and
the conditions of the decarburization annealing and the conditions of processes conducted before the decarburization annealing are adjusted so that a differences in concentrations of O, Si, Al, Mn and P between the front and back surfaces of the steel sheet after the decarburization annealing satisfy the following conditions (4) and (5) with respect to each average concentration between the front and back surfaces:
(4) each of O and Si: within ±10%,
(5) one or more of Al, Mn and P: within ±5%.

The steel material for a grain-oriented electrical steel sheet used in the method for producing a grain-oriented electrical steel sheet according to aspects of the invention has a chemical composition comprising C: 0.01 to 0.10 mass %, Si: 2.5 to 4.5 mass %, Mn: 0.01 to 0.5 mass %, one group selected from the following groups A to C as an inhibitor forming element:

Group A: Al: 0.01 to 0.04 mass % and N: 0.003 to 0.015 mass %,
Group B: one or two selected from S: 0.002 to 0.03 mass % and Se: 0.003 to 0.03 mass %, and
Group C: one or two selected from Al: 0.01 to 0.04 mass %, N: 0.003 to 0.015 mass %, S: 0.002 to 0.03 mass % and Se: 0.003 to 0.03 mass %, and
the remainder being Fe and inevitable elements, in which the annealing separator composed mainly of MgO contains not less than 50 mass % of MgO, 0.1 to 5 mass % of Ca compound as converted to Ca, and further contains at least one selected from hydroxide, nitrate, sulfate, oxide, borate and phosphate of Ti, Sr, Ba, Na, K, Li, Sb, Cr, Sn, Mn, Fe, Co, Ni, Cu and Al.

The steel material for a grain-oriented electrical steel sheet used in the method for producing a grain-oriented electrical steel sheet according to aspects of the invention has a chemical composition comprising C: 0.01 to 0.10 mass %, Si: 2.0 to 5.0 mass %, Mn: 0.01 to 1.0 mass %, Al: less than 0.01 mass %, N: less than 0.005 mass %, S: less than 0.005 mass %, Se: less than 0.005 mass % and the remainder being Fe and inevitable elements, and the annealing separator composed mainly of MgO contains not less than 50 mass % of MgO, 0.1 to 5 mass % of Ca compound as converted to Ca, and at least one selected from hydroxide, nitrate, sulfate, oxide, borate and phosphate of Ti, Sr, Ba, Na, K, Li, Sb, Cr, Sn, Mn, Fe, Co, Ni, Cu and Al.

The steel material for a grain-oriented electrical steel sheet used in the method for producing a grain-oriented electrical steel sheet according to aspects of the invention is characterized by further containing one or more selected from Ni: 0.010 to 1.50 mass %, Cr: 0.01 to 0.50 mass %, Cu: 0.01 to 0.50 mass %, P: 0.005 to 0.50 mass %, Sb: 0.005 to 0.50 mass %, Sn: 0.005 to 0.50 mass %, Bi: 0.005 to 0.50 mass %, Mo: 0.005 to 0.100 mass %, B: 0.0002 to 0.0025 mass %, Te: 0.0005 to 0.0100 mass %, Nb: 0.0010 to 0.0100 mass %, V: 0.001 to 0.010 mass %, Ti: 0.001 to 0.010 mass % and Ta: 0.001 to 0.010 mass % in addition to the above chemical composition.

The method for producing a grain-oriented electrical steel sheet according to aspects of the invention is characterized by
applying the annealing separator on the steel sheet surface and
subjecting the steel sheet to a uniformizing heat treatment of holding the sheet at a temperature of 800 to 950° C. for 5 to 200 hours and then to a finish annealing or
subjecting the steel sheet to the finish annealing subsequently to the uniformizing heat treatment.

The method for producing a grain-oriented electrical steel sheet according to aspects of the invention is characterized by analyzing the concentration of one or more elements selected from O, Si, Al, Mn and P on the front surface and/or back surface of the steel sheet online after the decarburization annealing and before the application of the annealing separator to evaluate the difference in the concentration of the element between the front and back surfaces of the steel sheet after the decarburization annealing.

The method for producing a grain-oriented electrical steel sheet according to aspects of the invention is characterized by analyzing the concentration of one or more elements selected from O, Si, Mg, Al, Mn, P, Ca and Ti on the front surface and/or back surface of the steel sheet online at any stage between the removal of the unreacted annealing separator and formation of the product sheet to evaluate coating properties of the product sheet.

The method for producing a grain-oriented electrical steel sheet according to aspects of the invention is characterized by feeding back the results of the online analysis to the decarburization annealing process and/or the process before the decarburization annealing process to adjust the decarburization annealing conditions and/or conditions of the process before the decarburization annealing.

According to aspects of the invention, it is possible to stably produce a grain-oriented electrical steel sheet being excellent in properties of an underlaying coating, irrespectively of the position in a coil during a finish annealing, which largely contributes to the improvement in product quality and increase in product yield.

DETAILED DESCRIPTION OF EMBODIMENTS OF THE INVENTION

There will be described experiments leading to the development of aspects of the invention.

Experiment 1

A steel comprising C: 0.06 mass %, Si: 3.3 mass %, Mn: 0.07 mass %, Al: 0.016 mass %, S: 0.003 mass % and the remainder being Fe and inevitable impurities is melted and shaped into a steel material (slab) by a continuous casting method. The slab is heated to 1380° C. and hot rolled to form a hot-rolled sheet having a sheet thickness of 2.2 mm. The hot-rolled sheet is then subjected to a hot-band annealing at 1000° C. for 60 seconds, a primary cold rolling to a middle sheet thickness of 1.8 mm, an intermediate annealing at 1100° C. for 80 seconds, and a secondarily cold rolling to obtain a cold-rolled sheet having a final sheet thickness of 0.23 mm. During the above process, the front and back surfaces of the cold-rolled sheet are measured by a fluorescence X-ray analysis and a roughness gauge, from which it has been confirmed that there is no difference in the residual oxide and the surface roughness between the front and back surfaces i.e., the difference in the measurement values between the front and back surfaces (front surface–back surface) is within ±5% with respect to the average value between the front and back surfaces.

Then, the cold-rolled sheet is made pass through a horizontal type (transverse type) continuous annealing furnace and subjected to a decarburization annealing combined with a primary recrystallization annealing, in which the sheet is heated from 500 to 700° C. at 100° C./sec in the heating process and held at 860° C. for 140 seconds. In the decarburization annealing, an atmosphere gas having $H_2:N_2=60:40$ as volume % ratio is fed from above and below the annealing furnace, but the dew point of the atmosphere gas inside the furnace is 55° C. at the furnace upper portion and 59° C. at the furnace lower portion due to steam retained in the bottom of the annealing furnace.

Next, an aqueous slurry of an annealing separator composed mainly of MgO and containing 5 mass % of titanium oxide and 0.1 mass % of sodium borate is applied on the steel sheet surface and dried. The concentration of CaO as an impurity contained in MgO is 0.4 mass % as converted to Ca. Further, the difference in the application amount of the annealing separator and the differences in the amounts of Ti, Na and B contained in the annealing separator applied, between the front and back surfaces of the steel sheet (front surface–back surface) fall within ±5% with respect to each average value between the front or back surface.

Then, the sheet is subjected to a finish annealing including secondary recrystallization of heating from room temperature to 800° C. at 25° C./hr and from 800 to 1100° C. at 20° C./hr; a purification of heating from 1100 to 1200° C. at 10° C./hr and holding a temperature of 1200° C. for 10 hours, and a furnace cooling. The atmosphere in the finish annealing is dry $N_2$ atmosphere from room temperature to 800° C., dry $H_2$ atmosphere from 800° C. to the end of the purification, and Ar atmosphere in the cooling.

After an unreacted annealing separator is removed from the steel sheet surface after the finish annealing, an insulation coating is applied thereon and a flattening annealing also acting as the baking of the coating is conducted at 800° C. for 1 minute to obtain a product sheet. The steel sheet is subjected to a heat treatment simulating stress-relief annealing at 800° C. for 2 hours. The sheet is then wound around a cylindrical rod and subjected to a bending and stripping test to measure the minimum diameter with which the stripping of the coating is not caused. The test result shows that the diameter of the front surface of the steel sheet (upper surface in the decarburization annealing) is 30 mmφ, and the diameter of the back surface (lower surface in the decarburization annealing) is 60 mmφ, from which a difference in the stripping resistance of the coating is recognized between the front and back surfaces.

Experiment 2

In order to investigate the cause for the difference in the stripping resistance between the front and back surfaces of the steel sheet in Experiment 1, the cold-rolled sheet produced under the same condition as in Experiment 1 is subjected to a decarburization annealing, in which the dew point of the atmosphere gas fed to the front and back surfaces of the steel sheet is varied as shown in conditions 2 and 3 of the following Table 1, and then a product sheet is produced under the same conditions as in Experiment 1. The coating adhesiveness after stress-relief annealing is measured in the same manner as in Experiment 1. The results are shown in Table 1, where the dew point of the atmosphere of Experiment 1 is shown as condition 1.

TABLE 1

| | Front surface (upper surface in furnace) | | Back surface (lower surface in furnace) | |
|---|---|---|---|---|
| | Dew point (° C.) | Bending and-stripping diameter (mm) | Dew point (° C.) | Bending and-stripping diameter (mm) |
| Condition 1 (Experiment 1) | 55 | 30 | 59 | 60 |
| Condition 2 | 59 | 20 | 59 | 20 |
| Condition 3 | 55 | 20 | 55 | 20 |

The results of Table 1 show that, in the condition 1 that the dew point of the atmosphere gas is different between the front and back surfaces, the coating adhesiveness is deteriorated at the back surface having a high dew point while it is excellent at the front surface having the low dew point. On the other hand, the coating adhesiveness is good in both of the condition 2 where the dew points of the front and back surfaces are adjusted to have the same value as on the back surface of the condition 1 being poor in the coating adhesiveness, and the condition 3 that the dew points of the front and back surfaces are adjusted to have the same value as on the front surface of the condition 1 being excellent in the coating adhesiveness. From these results, it is considered that the deterioration in the coating adhesiveness on the back surface in the condition 1 is caused not due to the inappropriate dew point itself of the atmosphere gas, but due to the difference in the dew point between the front and back surfaces.

In order to further investigate the above cause, the concentration of each element on the steel sheet surface after the decarburization annealing and after the finish annealing are measured to determine a difference R in concentration of each element between the front and back surfaces. The difference R in concentration between the front and back surfaces is defined by the following equation:

Concentration Difference $R$ between front and back surfaces (%)=$2\times(I_F-I_B)/(I_F+I_B)\times100$ where $I_F$ and $I_B$ represent the count numbers of an element on the front surface and back surface of the steel sheet determined by a fluorescence X-ray analysis, respectively.

Moreover, the later-described difference R in concentration between the front and back surfaces will be defined by the above equation.

The elements present on the surface of the steel sheet after the decarburization annealing are enriched on the surface or in the surface layer of the steel sheet by the decarburization annealing and form oxide films. The formation amount and the concentration distribution of the oxide film can be indirectly determined from the intensities of the measured elements.

Table 2 shows the measurement results of O, Si, Al, Mn and P concentrations on the steel sheet surface after the decarburization annealing and the difference R in concentration of each element between the front and back surfaces.

Table 2 shows the result that the concentration of each element on the steel sheet surface after the decarburization annealing is high on the back surface having a high dew point except for Al under the condition 1 where the dew point of the atmosphere gas is different between the front and back surfaces of the steel sheet. Although under the conditions 2 and 3 where the dew point of the atmosphere gas is adjusted so as not to cause the difference between the front and back surfaces, the concentration of each element on the steel sheet surface after the decarburization annealing varies in accordance to the dew point, the difference R in concentration between the front and back surfaces is decreased to not more than ½ with respect to the condition 1.

TABLE 2

| | Condition 1 (Experiment 1) | | | Condition 2 | | | Condition 3 | | |
|---|---|---|---|---|---|---|---|---|---|
| Analyzed element | $I_F$ (kcps) (dp: 55° C.) | $I_B$ (kcps) (dp: 59° C.) | Difference R in concentration between front and back surfaces (%) | $I_F$ (kcps) (dp: 59° C.) | $I_B$ (kcps) (dp: 59° C.) | Difference R in concentration between front and back surfaces (%) | $I_F$ (kcps) (dp: 55° C.) | $I_B$ (kcps) (dp: 55° C.) | Difference R in concentration between front and back surfaces (%) |
| O | 7.3 | 8.6 | −16.4 | 8.8 | 8.3 | 5.8 | 7.3 | 6.9 | 5.6 |
| Si | 56.8 | 62.9 | −10.2 | 61.3 | 63.8 | −4.0 | 58.3 | 56.1 | 3.8 |
| Al | 0.33 | 0.28 | 16.4 | 0.29 | 0.28 | −6.7 | 0.34 | 0.33 | 3.0 |
| Mn | 6.8 | 7.6 | −11.1 | 7.8 | 7.5 | 3.9 | 7.1 | 7.3 | −2.8 |
| P | 5.1 | 5.9 | −14.5 | 5.7 | 5.4 | 5.4 | 5.4 | 5.6 | −3.6 |

Table 3 shows the measurement results of the concentrations of O, Si, Mg, Al, Mn, P, Ca and Ti on the steel sheet surface after the finish annealing, and the difference R in concentration of each element between the front and back surfaces. The reason for adding Mg, Ca and Ti after the decarburization annealing, as the element on the steel sheet surface to be measured after the finish annealing, is due to the fact that these elements are contained in the annealing separator and exert influence on the formation of forsterite coating.

TABLE 3

| | Condition 1 (Experiment 1) | | | Condition 2 | | | Condition 3 | | |
|---|---|---|---|---|---|---|---|---|---|
| Analyzed element | $I_F$ (kcps) (dp: 55° C.) | $I_B$ (kcps) (dp: 59° C.) | Difference R in concentration between front and back surfaces (%) | $I_F$ (kcps) (dp: 59° C.) | $I_B$ (kcps) (dp: 59° C.) | Difference R in concentration between front and back surfaces (%) | $I_F$ (kcps) (dp: 55° C.) | $I_B$ (kcps) (dp: 55° C.) | Difference R in concentration between front and back surfaces (%) |
| O | 46.8 | 58.3 | −21.9 | 55.9 | 57.5 | −2.8 | 47.3 | 48.5 | −2.5 |
| Si | 348 | 439 | −23.1 | 443 | 462 | −4.2 | 359 | 370 | −3.0 |
| Mg | 509 | 631 | −21.4 | 603 | 628 | −4.1 | 518 | 530 | −2.3 |
| Al | 24.5 | 30.6 | −22.1 | 29.1 | 30.5 | −4.7 | 25.1 | 25.8 | −2.8 |
| Mn | 10.8 | 8.3 | 26.2 | 8.4 | 9.1 | −8.0 | 9.1 | 8.3 | 9.2 |
| P | 5.6 | 3.5 | 46.2 | 4.8 | 4.1 | 15.7 | 5.1 | 4.5 | 12.5 |
| Ca | 15.2 | 6.9 | 75.1 | 12.3 | 10.2 | 18.7 | 13.2 | 11.8 | 11.2 |
| Ti | 28.1 | 13.8 | 68.3 | 24.1 | 21.3 | 12.3 | 26.4 | 25.9 | 1.9 |

Table 3 shows the following points.
(1) Similar to the results after the decarburization annealing (Table 2), the difference R in concentration of each element between the front and back surfaces of the steel sheet after the finish annealing is large in the condition 1, and is decreased to not more than ⅓ of the condition 1 in the conditions 2 and 3.
(2) The concentrations of O, Si, Mg and Al on the steel sheet surface being an ingredient constituting the underlaying coating (forsterite coating) are higher on the back surface of the condition 1 having a high dew point than those in the condition 2 having the same dew point except for Si, and, conversely, lower on the front surface of the condition 1 having a low dew point than those in the condition 3 having the same dew point except for Si.
(3) Under the conditions 2 and 3, the concentrations of the remaining elements, Mn, P, Ca and Ti on the steel sheet surface take intermediate values of those on the front and back surfaces under the condition 1.

The result of Table 3 shows that, when the concentration of the element such as O, Si, Al or the like is different on the front and back surfaces of the steel sheet after the decarburization annealing, the difference in concentration between the front and back surfaces tends to change so as to further increase after the finish annealing. Therefore, it is considered that in the condition 1 the formation of the coating on the back surface is promoted by the finish annealing where a large amount of oxide film is considered to be formed, and hence the coating becomes thicker to deteriorate the adhesiveness of the coating.

Although the cause of such a phenomenon is not still clear sufficiently at this moment, the inventors have considered as follows.

The forsterite coating is formed during the finish annealing, when Mg ion and O ion contained in the annealing separator or Ti ion or Ca ion contained in the additive invades (moves) into the steel sheet surface while Si, Al and the like in the steel sheet are enriched on the surface of the coating and these elements react with each other. In the formation, the elements such as Mn, P, Ca, Ti and the like are enriched on the grain boundary face of the coating (grain boundary face of forsterite or the like) or cause solid-solution into the coating to act to strengthen the forsterite coating and enhance the adhesiveness.

Since the finish annealing is conducted on the steel sheet wound into a coil state (a state of laminating the steel sheet), there is a difference in concentration between the front and back surfaces of the steel sheet, i.e., a difference in the amount of the oxide film formed between the front and back surfaces. When one surface is in an advantageous state to the formation of the coating as compared to the other surface, the elements (e.g. Ti, Ca and the like) that has been added to the annealing separator preferentially move from the other surface which is disadvantageous to the formation of the coating toward the advantageous surface, and thus the above elements decrease on the disadvantageous surface. Consequently, O, Si, Mg and Al as a main element constituting the ceramic underlaying coating composed mainly of forsterite, spinel and the like, and Mn, P, Ca and Ti and the like as an element strengthening the coating become excessive on one surface but lacking on the other surface, resulting in deterioration in the coating adhesiveness on both surfaces.

In order to prevent the above defect, therefore, it is important that the oxide film is uniformly formed on the front and back surfaces of the steel sheet at least after the decarburization annealing to thereby decrease the differences in concentrations of the elements present on the front and back surfaces, whereby the diffusion of the elements in the annealing separator is uniformly conducted on the front and back surfaces during the finish annealing.

As described above, it is important that the front and back surfaces of the steel sheet at least after the decarburization annealing have the same surface quality in order to obtain the steel sheet with an excellent coating adhesiveness. However, it is not necessarily attained easily in the industrial production, because not only the conditions of the decarburization annealing (annealing temperature, annealing time, ingredients of atmosphere gas, dew point and so on) but also conditions of the previous processes such as slab heating condition, hot-rolling condition, hot-band annealing condition, cold-rolling condition, intermediate annealing condition, pickling condition, cleaning condition and so on all affect the surface quality of the steel sheet after the decarburization annealing, and it is practically difficult to control all of these conditions.

The inventors have examined a method for forming a uniform forsterite coating, even when there is caused some differences in the surface quality (oxide film) between the front and back surfaces of the steel sheet after the decarburization annealing, by mitigating the differences.

Experiment 3

A coil for a grain-oriented electrical steel sheet is produced under the same conditions as in Experiment 1. The coil, on which an annealing separator is coated and dried, is subjected to a soaking treatment of holding varying temperatures between 700 and 1000° C. for varying time within 1 to 400 hours and then to purification of heating to 1200° C. at 20° C./hr and holding 1200° C. for 10 hours, during the heating process in the finish annealing. The atmosphere gas in the finish annealing is a dry $N_2$ gas from the start of the heating to the end of soaking treatment and in the cooling after the purification, and a mixed gas of 75 vol % $H_2$+25 vol % $N_2$ from the end of the soaking treatment to the end of the purification. Thereafter, a flattening annealing is conducted under the same conditions as in Experiment 1 to form a product sheet.

The concentrations of O, Si, Mg, Al, Mn, P, Ca and Ti on the front and back surfaces of the obtained product steel sheet are measured by using a fluorescence X-ray to determine the difference R in concentration of each element between the front and back surfaces, and measurement results are shown in Table 4. Moreover, samples are taken out from both widthwise end portions of the front and back ends of the coil (four positions in total), and a bending and stripping diameter thereof is measured in the same manner as in Experiment 1 to evaluate the stripping resistance of the coating. The worst result value among the four positions is also shown in Table 4 as a representative value of the condition.

As seen from Table 4, the difference R in concentration of each element between the front and back surfaces is reduced (uniformized) and the coating adhesiveness is improved, by performing the soaking treatment of holding the sheet at a proper temperature for a proper time during the heating process in the finish annealing, concretely at a temperature ranging from 800 to 950° C. for 5 to 200 hour. In this regard, the soaking treatment for uniformizing the difference R in concentration between the front and back surfaces is also referred to as "uniformizing heat treatment" in accordance with aspects of the invention.

TABLE 4

|  |  | Temperature(° C.) | | | | | |
|---|---|---|---|---|---|---|---|
|  |  | 700 | 800 | 900 | 950 | 1000 | 850 |
|  |  | Time(hr) | | | | | |
|  |  | 5 | 5 | 5 | 5 | 5 | 1 |
| Difference R in concentration of analyzed element between front and back surfaces (%) | O | −10.8 | −4.8 | −3.5 | −3.7 | −5.2 | −10.9 |
|  | Si | −13.1 | −3.9 | −2.8 | −3.6 | −5.1 | −13.6 |
|  | Mg | −12.5 | −4.2 | −4.1 | −3.2 | −4.8 | −11.8 |
|  | Al | −14.6 | −13.5 | −10.6 | −11.5 | −15.6 | −14.3 |
|  | Mn | 12.2 | 15.1 | 13.2 | 15.3 | 16.3 | 12.8 |
|  | P | 19.3 | 13.3 | 11.0 | 11.2 | 14.8 | 18.6 |
|  | Ca | 21.5 | 20.1 | 13.6 | 11.6 | 25.2 | 22.1 |
|  | Ti | 28.9 | 16.2 | 14.3 | 20.3 | 20.8 | 27.9 |
| Bending and stripping diameter (mm) |  | 50 | 30 | 30 | 30 | 40 | 50 |
| Remarks |  | Comparative Example | Invention Example | Invention Example | Invention Example | Comparative Example | Comparative Example |

|  |  | Temperature(° C.) | | | | | |
|---|---|---|---|---|---|---|---|
|  |  | 850 | 850 | 850 | 850 | 850 | 850 |
|  |  | Time(hr) | | | | | |
|  |  | 10 | 50 | 100 | 150 | 200 | 250 |
| Difference R in concentration of analyzed element between front and back surfaces (%) | O | −4.5 | −3.3 | −2.1 | −3.8 | −4.6 | −5.3 |
|  | Si | −4.7 | −2.9 | −2.8 | −3.3 | −4.6 | −5.8 |
|  | Mg | −4.8 | −4.1 | −3.6 | −4.7 | −5.0 | −5.9 |
|  | Al | −14.1 | −12.3 | −10.2 | −9.8 | −11.6 | −15.3 |
|  | Mn | 11.5 | 12.2 | 13.2 | 14.8 | 15.1 | 16.3 |
|  | P | 15.3 | 13.4 | 11.3 | 12.3 | 14.1 | 15.5 |
|  | Ca | 18.3 | 16.1 | 15.2 | 18.8 | 22.2 | 21.6 |
|  | Ti | 20.1 | 18.2 | 14.6 | 17.6 | 18.9 | 22.1 |
| Bending and stripping diameter (mm) |  | 30 | 25 | 25 | 30 | 30 | 50 |
| Remarks |  | Invention Example | Invention Example | Invention Example | Invention Example | Invention Example | Comparative Example |

Regarding the mechanism that allows the concentration of each element on the front and back surfaces of the steel sheet to be uniform by applying uniformizing heat treatment in the finish annealing as described above, the inventors believe that this is because the uniformizing heat treatment promotes the movement of ions toward the surface that is disadvantageous to the formation of the coating. That is, when there is a surface disadvantageous to the formation of the coating but the uniformizing heat treatment is not conducted, Mg ion in the annealing separator and Ti, Ca ion or the like in the additive preferentially move to the surface advantageous to the formation of the coating, resulting in deterioration in the coating properties on the surface disadvantageous to the formation of the coating. On the other hand, when the uniformizing heat treatment is conducted before the formation of the coating, ions of various additives contained in the annealing separator form a reaction layer of a precursor stage of the coating even on the surface of the steel sheet disadvantageous to the formation of the coating. As a result, the coating formations on the front and back surfaces are uniformized when the temperature reaches a high temperature range of not lower than 1120° C. where the underlaying coating is formed during the finish annealing, and hence the deterioration in the coating properties is prevented.

Aspects of the invention were developed based on the above novel knowledge.

There will be described a chemical composition of the steel material (slab) used in a production of a grain-oriented electrical steel sheet according to aspects of the invention below.

C: 0.01 to 0.10 mass %

When C is less than 0.01 mass %, the effect of strengthening the grain boundary by C is lost to cause cracking in the slab, causing defects that will hinder the production. On the other hand, when C exceeds 0.10 mass %, it is difficult to reduce C to not more than 0.004 mass % causing no magnetic aging in the decarburization annealing. Therefore, C is preferable to be within the range of 0.01 to 0.10 mass %. More preferably, it is within the range of 0.02 to 0.08 mass %.

Si: 2.5 to 4.5 mass %

Si is an element necessary for increasing a specific resistance of steel to reduce an iron loss. When it is less than 2.5 mass %, the above effect is not sufficient, while when it exceeds 4.5 mass %, the workability is decreased and production by rolling becomes difficult. Therefore, Si is preferable to fall within the range of 2.5 to 4.5 mass %. More preferably, it is within the range of 2.8 to 3.7 mass %.

Mn: 0.01 to 0.5 mass %

Mn is an element necessary for improving hot workability of steel. The above effect is not sufficient when it is less than 0.01 mass %, while the magnetic flux density of the product sheet is lowered when it exceeds 0.5 mass %. Therefore, Mn is preferable to fall within the range of 0.01 to 0.5 mass %. More preferably, it is within the range of 0.02 to 0.20 mass %.

The ingredients other than C, Si and Mn are different depending on using an inhibitor for causing secondary recrystallization or not.

When using an inhibitor, for example, an AlN-based inhibitor Al and N to cause secondary recrystallization, Al and N are preferable to be contained in the ranges of Al: 0.01 to 0.04 mass % and N: 0.003 to 0.015 mass %, respectively. When using a MnS.MnSe-based inhibitor, it is preferable to contain Mn of the aforementioned amount and one or two selected from S: 0.002 to 0.03 mass % and Se: 0.003 to 0.03 mass %. When the addition amount of each element is less than the lower limit, the effect of the inhibitor cannot be obtained sufficiently, while when it exceeds the upper limit, the inhibitor remains at non-solid solution state in the slab heating, causing deterioration in the magnetic properties. Moreover, the AlN-based inhibitor and the MnS.MnSe-based inhibitor may be used in combination.

On the other hand, when using no inhibitor to cause secondary recrystallization, it is preferable to use a steel material in which contents of Al, N, S and Se being the inhibitor forming ingredients are decreased as much as possible to such a level as Al: less than 0.01 mass %, N: less than 0.005 mass %, S: less than 0.005 mass % and Se: less than 0.005 mass %.

In the steel material used in accordance with aspects of the invention, the remainder other than the above ingredients is substantially Fe and inevitable impurities. For the purpose of improving the magnetic properties, one or more selected from Ni: 0.010 to 1.50 mass %, Cr: 0.01 to 0.50 mass %, Cu: 0.01 to 0.50 mass %, P: 0.005 to 0.50 mass %, Sb: 0.005 to 0.50 mass %, Sn: 0.005 to 0.50 mass %, Bi: 0.005 to 0.50 mass %, Mo: 0.005 to 0.100 mass %, B: 0.0002 to 0.0025 mass %, Te: 0.0005 to 0.0100 mass %, Nb: 0.0010 to 0.0100 mass %, V: 0.001 to 0.010 mass %, Ti: 0.001 to 0.010 mass % and Ta: 0.001-0.010 mass % may be properly contained in addition to the aforementioned ingredients.

There will be described a method for producing a grain-oriented electrical steel sheet according to the aspects of invention below.

A slab to be a steel material for a grain-oriented electrical steel sheet according to aspects of the invention may be produced by melting a steel having a chemical composition conforming to aspects of the invention by a usual refining process and then conducting a known ingot casting-blooming method or a continuous casting method. Alternatively, a thin slab having a thickness of not more than 100 mm may be produced directly by a direct casting method.

Then, the slab is heated to a predetermined temperature in accordance with the usual manner. For example, when containing the inhibitor-forming ingredient, the slab is heated to a temperature of about 1400° C., concretely a temperature of 1350 to 1440° C. to dissolve the inhibitor into steel, while when containing no inhibitor-forming ingredient, the slab is heated to a temperature of not higher than 1250° C., and the slab is then hot rolled to form a hot-rolled sheet. Moreover, when containing no inhibitor-forming ingredient, the slab may be subjected to hot rolling immediately after the continuous casting without heating. Moreover, the thin slab may be hot rolled or proceed to a next process without hot rolling. The hot rolling is conducted according to the usual manner, and the conditions thereof are not particularly limited.

Next, the hot-rolled sheet obtained by the hot rolling is subjected to hot-band annealing, if necessary. The soaking temperature in the hot-band annealing is preferable to be in the range of 800 to 1150° C., in order to obtain good magnetic properties. When it is lower than 800° C., the effect of the hot-band annealing is insufficient to cause a band structure formed by the hot rolling to remain, so that primary recrystallization structure of well-ordered grains may not be obtained, which may hinder development of secondary recrystallization. On the other hand, when it exceeds 1150° C., the grain size after the hot-band annealing becomes excessively coarse and it is also difficult to obtain the primary recrystallization structure of well-ordered grains.

Then, the hot-rolled sheet after the hot rolling or after the hot-band annealing is subjected to one cold rolling or two or more cold rollings having an intermediate annealing interposed therebetween to form a cold-rolled sheet having a final sheet thickness. The annealing temperature of the intermediate annealing is preferably in the range of 900 to 1200° C. When the temperature is lower than 900° C., recrystallized grains after the intermediate annealing become finer and Goss nucleus in the primary recrystallization structure may decrease to deteriorate the magnetic properties of a product sheet. When the temperature exceeds 1200° C., the crystal grains become excessively coarser like in the case of the hot-band annealing, and thus it becomes difficult to obtain the primary recrystallization structure of well-ordered grains.

In the cold rolling to the final sheet thickness (final cold rolling), it is preferable to adopt a warm rolling for rolling the sheet at a temperature raised to the range of 100 to 300° C., or to perform one or plural aging treatments between rolling passes at a temperature of 100 to 300° C. during the cold rolling. Thus, the primary recrystallization texture is improved to further improve the magnetic properties.

Then, the cold-rolled sheet having the final sheet thickness is subjected to a decarburization annealing combined with a primary recrystallization annealing. The decarburization annealing reduces the C concentration in steel to not more than 0.004 mass %, with which no magnetic aging is caused. In the heating process of the decarburization annealing, it is preferable to conduct rapid-heating from 500 to 700° C. at not less than 50° C./sec before the soaking temperature is reached. Thus, the secondary recrystallized grains are finely divided to improve the iron loss property. Also, it is preferable that the soaking temperature for performing the decarburization annealing falls within the range of 780 to 950° C. and that the soaking time falls within the range of 80 to 200 seconds. The soaking temperature of lower than 780° C. or the soaking time of shorter than 80 seconds cause poor decarburization and insufficient primary grain growth. On the other hand, the soaking temperature exceeding 950° C. or the soaking time exceeding 200 seconds cause the growth of the primary recrystallized grains to progress excessively. More preferably, the soaking temperature falls within the range of 800 to 930° C., and the soaking time falls within the range of 90 to 150 seconds.

The atmosphere in the soaking of the decarburization annealing is preferably a wet hydrogen atmosphere, where the dew point is adjusted and the oxygen potential $P_{H2O}/P_{H2}$ is set within the range of 0.3 to 0.6. $P_{H2O}/P_{H2}$ of less than 0.3 causes poor decarburization, while $P_{H2O}/P_{H2}$ exceeding 0.6 causes FeO to be easily formed on the steel sheet surface to deteriorate the coating properties. More preferably, it is in the range of 0.4 to 0.55.

The oxygen potential $P_{H2O}/P_{H2}$ of the atmosphere during the heating in the decarburization annealing is not necessary to be the same as that in the soaking, and may be controlled independently. Also, the atmosphere in the soaking is not necessarily constant. For example, the soaking process may be divided into two stages, and the atmosphere at the latter stage may be a reducing atmosphere having an oxygen potential $P_{H2O}/P_{H2}$ of not more than 0.2. Thus, the configuration of the oxide film to be formed on the surface layer of the steel sheet is improved to be advantageous to the improvement of the magnetic properties and coating properties. Moreover, $P_{H2O}/P_{H2}$ at the latter stage is more preferably not more than 0.15.

It is the most important in accordance with aspects of the invention to decrease the differences R in concentrations of various elements that are enriched on the steel sheet surface during the decarburization annealing between the front and back surfaces, i.e., the difference in the oxide film amount formed on the front and back surfaces of the steel sheet after the decarburization annealing. Consequently, the diffusion of elements that forms the coating can be uniformized between the front and back surfaces during the finish annealing to improve the coating properties.

The element to be enriched on the steel sheet surface during the decarburization annealing and form the oxide film includes O, Si, Al, Mn and P. The differences R in concentrations of the elements, O and Si, being a main component for forming the oxide film, between the front and back surfaces are necessary to be within ±10%. It is not necessary to control all the element of Al, Mn and P, but these elements largely affect the formation of the underlaying coating, so that the difference R in concentration of each element between the front and back surfaces is desirable to be small, and concretely, the difference R in concentration of one or more of these elements between the front and back surfaces is necessary to be within ±5%. Moreover, the differences R in concentrations of O and Si between the front and back surfaces are each preferable to be within ±5%, and the difference R in concentration of one or more of Al, Mn and P between the front and back surfaces are preferable to be within ±3%.

In order to keep the difference R in concentration of each element between the front and back surface within the above range, it is important to adjust not only the decarburization annealing conditions (annealing temperature and time, components of the atmosphere gas, dew point and the like) but also the conditions of the previous process before the decarburization annealing so as to allow the surface qualities of the front and back surfaces of the steel sheet to uniform (uniformizing treatment of the surface quality). To this end, it is desirable to analyze the concentrations of the elements on the front and back surfaces of the steel sheet after the decarburization annealing online by using a fluorescence X-ray, an infrared absorbance photometer or the like, and feeding back the analyzed results to the previous process to adjust the decarburization annealing conditions and the conditions of the previous process before the decarburization annealing so as to decrease the differences R in concentrations of the elements between the front and back surfaces of the steel sheet. Concretely, it is desirable to adjust the conditions so that the differences between the front and back surfaces of the residual oxide on the steel sheet surface and the surface roughness (front surface–back surface) are within ±5% with respect to the average value between the front and back surfaces.

Although it is desirable to measure the concentrations of the elements both on the front and back surfaces of the steel sheet after the decarburization annealing, when the concentrations between the front and back surfaces have some tend and the concentration on one surface of the surface can be estimated by the measurement value of the other, it is allowable to measure only one surface. It is also desirable to measure all the elements above, but when there is a correlation between each element and the concentration of a certain element can be presumed by measuring another element, the elements to be measured may be reduced.

A slurry of an annealing separator composed mainly of MgO is applied to the surface of the cold-rolled sheet after the decarburization annealing and dried. The annealing separator is necessary to contain not less than 50 mass % MgO and further 0.1 to 5 mass % Ca compound as converted to Ca. As having an effect of promoting the formation of the underlaying coating by its catalytic action, Ca is an important element for uniformizing the formation of the coating on the front and back surfaces. The effect is insufficient when the Ca amount is less than 0.1 mass %, while dot-like defect is caused when the Ca amount exceeds 5 mass %. Moreover, the MgO content is preferably not less than 70 mass %, and the Ca compound content is preferable to fall within the range of 0.2 to 1 mass % as converted to Ca.

The conventionally known additives such as compounds of Ti, Na, Al, Sb and the like can be properly added to the annealing separator composed mainly of MgO, in addition to the above Ca compound. In this case, the content of these compounds is preferably less than 50 mass % in total. When it exceeds 50 mass %, the MgO content becomes less than 50 mass % to cause poor formation of the forsterite coating. More preferably, it is not more than 30 mass % in total.

The amount of the annealing separator applied to the steel sheet surface may be in a known range and is not particularly limited. When the difference in concentration of the element between the front and back surfaces of the steel sheet after the decarburization annealing is large, it is considered that the above difference in concentration can be mitigated by changing the amount of the annealing separator applied between the front and back surfaces. However, the finish annealing is conducted in a state of winding the steel sheet into a coil (in a state of laminating the steel sheet), so that the front and back surfaces of the steel sheet are opposed to each other in the annealing. Therefore, the additive ingredients in the annealing separator move toward the opposed surfaces to balance the difference of the application amount, and thus the obtained effect is limited.

The steel sheet coated with the annealing separator is then subjected to a finish annealing including causing secondary recrystallization on the steel sheet coil at an up-end state, i.e., with the shaft center of the coil placed vertical to the floor and performing purification.

When causing the secondary crystallization annealing while heating the coil in the finish annealing, it is preferable to conduct the heating in a temperature range of 700 to 1100° C. at a heating rate of 2 to 50° C./hr, while when the secondary recrystallization is caused during a retention treatment of holding the coil at a constant temperature, it is preferable to hold the coil in the above temperature range for not less than 25 hours. It is also preferable to heat the coil to a temperature of not lower than 1100° C. to complete the secondary recrystallization.

It is preferable to perform purification of holding the coil at a temperature of 1120 to 1250° C. for 2 to 50 hours in the finish annealing, in order to form a forsterite coating after the secondary recrystallization is caused and, at the same time, to discharge the impurities contained in the steel sheet to be an inevitable impurity level (Al, N, S and Se: not more than 0.0020 mass %). When the temperature of the purification is lower than 1120° C. or the holding time is less than 2 hours, the purification is insufficient, while when the temperature of the purification is higher than 1250° C. or the holding time exceeds 50 hours, buckling deformation is caused in the coil to bring about shape defect and decrease in a product yield. It is more preferable to hold the coil at a temperature of 1150 to 1230° C. for 3 to 40 hours.

In accordance with aspects of the invention, it is preferable to perform uniformizing heat treatment for uniformizing the concentration of the elements on the front and back surfaces by holding the steel sheet at a given temperature for a given time before the underlaying coating is formed in the finish annealing. The uniformizing heat treatment may be performed at a stage before the formation of the underlaying coating in the finish annealing or may be performed before the finish annealing as a process different from the finish annealing. The uniformizing heat treatment promotes diffusion of the additive ingredients contained in the annealing separator onto the surface layer of the steel sheet, even onto the surface where the coating may be difficult to form, so that it is possible to form uniform coatings on the front and back surfaces.

The uniformizing heat treatment is preferable to be performed under a condition of holding at a temperature of 800 to 950° C. for 5 to 200 hours. When the temperature is lower than 800° C. or the time is less than 5 hours, the above effect cannot be obtained sufficiently, while when the temperature is higher than 950° C. or the time exceeds 200 hours, the activity of MgO is lost to deteriorate the coating properties. The more preferable condition is that the temperature is in the range of 840 to 920° C. and the time is in the range of 10 to 150 hours. Since the condition of the uniformizing heat treatment overlaps with the temperature range where the secondary recrystallization is caused, the uniformizing heat treatment may be conducted the process for causing the secondary recrystallization in the finish annealing can be simplified or omitted in accordance with the condition of the uniformizing heat treatment when performing the uniformizing heat treatment.

When the uniformizing heat treatment and the finish annealing are conducted separately, an average heating rate from room temperature to the temperature of the purification in the finish annealing is preferably in the range of 5 to 50° C./hr, more preferably 8 to 30° C./hr. On the other hand, when the uniformizing heat treatment is conducted with incorporated into the finish annealing, it is preferable to conduct heating, subsequently to the completion of the uniformizing heat treatment, from the temperature of the uniformizing heat treatment to the temperature of the purification at an average heating rate of 5 to 50° C./hr, more preferably 8 to 30° C./hr.

Then, the steel sheet after the finish annealing is preferable to be subjected to washing with water, brushing, pickling and the like to remove unreacted annealing separator adhered to the steel sheet surface, and then subjected to a flattening annealing for shape correction. This treatment is to prevent the deterioration in the magnetic properties due to the winding curl of the coil caused when the finish annealing is conducted on the steel sheet wound into a coil.

In order that the grain-oriented electrical steel sheet (product sheet) according to aspects of the invention produced by satisfying the above conditions has an excellent coating adhesiveness, it is necessary that the difference R in concentration of each of O, Si, Mg, Al, Mn, P, Ca and Ti between the front and back surfaces falls within predetermined ranges, when the steel sheet surface is analyzed with an analysis device such as fluorescence X-ray analyzer, infrared absorbance photometer or the like. Concretely, the difference in concentration of each of O, Si and Mg as a main ingredient of the underlaying coating should be within ±5%, the difference in concentration of one or more of Al, Mn and P should be within ±15%, and the difference in concentration of one or more of Ca and Ti should be within ±20%. In order to have more excellent coating adhesiveness, the difference in concentration of each of O, Si and Mg should be within ±3%, and the difference in concentration of one or more of Al, Mn and P should be within ±10%, and the difference in concentration of one or more of Ca and Ti should be within ±15%.

The conditions in the measurement by the fluorescence X-ray analyzer is preferably that the voltage is in the range of 10 kV to 60 kV and the current is in the range of 1 mA to 30 mA. The upper limits of the voltage and current are preferable from a viewpoint of penetration depth of the fluorescence X-ray, and the lower limit thereof is preferable from a view point of a detection sensitivity. The atmosphere in the measurement is preferably a vacuum, from a viewpoint of a measurement accuracy, but may be an atmospheric air from a viewpoint of a handling property of the measurement device and the introduction cost. The fluorescence X-ray analyzer has two types, a wavelength dispersion type and energy dispersion type, both of which can be used.

The steel sheet coil is subjected to the finish annealing at an up-end state, and thus the annealing conditions largely differ depending on the position in the coil, for example, between the upper and lower sides of the coil, and between the outer portion and inner portion of the coil. Under such a situation, when the difference in concentration of the element between the front and back surfaces of the steel sheet is large, local deterioration in the product quality, particularly deterioration in coating properties is easily caused. From a viewpoint of guaranteeing the quality of the product sheet, therefore, it is preferable to confirm that the differences R in concentrations of O, Si, Mg, Al, Mn, P, Ca and Ti on the surface of the product sheet between the front and back surfaces are within the above ranges, by analyzing the concentrations of those elements online by an infrared spectroscopy, a fluorescence X-ray method, an X-ray diffraction method and so on.

The online analysis is desirably performed after the finish annealing, concretely after the removal of the unreacted annealing separator and before the formation of an insulation coating, but may be performed after the formation of the insulation coating when the element to be measured is not contained in the insulation coating.

In addition to conducting the quality evaluation of the product sheet based on the online analytical results, a pretreatment for uniformizing the surface quality (uniformizing treatment of surface quality) may be performed by feeding back the above analytical results to the previous process to adjust the decarburization annealing conditions and the conditions of the previous processes before the decarburization annealing. It becomes thereby possible to guarantee the quality of the product sheet more surely.

The online analysis is desirable to be performed over full length and width of the front and back surfaces of the steel sheet coil, but may be limited to the position where the coating properties tend to be deteriorated, for example, inner and outer portions of the coil or upper and lower end portions of the coil (both widthwise end portions) in the finish annealing. Furthermore, the online analysis is desirable to be conducted both on the front and back surfaces, but when being represented by either one surface as previously mentioned, either one surface may be allowable. Moreover, it is not necessary to analyze all the elements of O, Si, Mg, Al, Mn, P, Ca and Ti, and the element to be analyzed may be limited to, for example, the main elements such as O, Si, and Mg that largely affect the coating properties.

When the gran-oriented electrical steel sheet is laminated to be used as a product sheet, it is preferable that the steel sheet has an insulation coating on the surface. When the iron loss property is particularly emphasized, it is preferable to adopt a tension-applied coating that provides tension to the steel as the insulation coating. The insulation coating may be formed during the flattening annealing or at a process before or after the flattening annealing.

In order to further reduce the iron loss, it is preferable to conduct a magnetic domain subdividing treatment. The magnetic domain subdividing method can use a conventionally-known method such as a method of forming grooves by etching the surface of the cold-rolled steel sheet rolled to the final sheet thickness, a method of irradiating laser or plasma onto the steel sheet surface of a product sheet to introduce linear or point-like hot strain or impact strain.

EXAMPLES

Example 1

Steel slabs having various chemical compositions shown in Table 5 are produced by a continuous casting method, heated to 1410° C. and hot rolled to form hot-rolled sheets each having a sheet thickness of 2.5 mm. Each hot-rolled sheet is then subjected to a hot-band annealing at 1000° C. for 50 seconds, a primarily cold rolling to have a middle sheet thickness of 1.8 mm, an intermediate annealing at 1100° C. for 20 seconds, and a secondary cold rolling to form a cold-rolled sheet having a final sheet thickness of 0.23 mm. According to measurement by a glow discharge spectrometer and a roughness gauge, it has been confirmed that there are little differences in the residual oxide and the surface roughness between the front and back surfaces of the cold-rolled sheets, i.e., the differences of the measured values between the front and back surfaces (front surface−back surface) are within ±5% with respect to the average value of the front and back surfaces.

Then, the cold-rolled sheet is subjected to a decarburization annealing combined with a primary recrystallization annealing by holding to soak at a temperature of 860° C. for 220 seconds. The decarburization annealing is conducted by heating the sheet to the above soaking temperature at a heating rate of 50° C./sec in a wet hydrogen atmosphere of $P_{H2O}/P_{H2}$: 0.40 (dew point: 63.5° C.) and adjusting the dew point of an atmosphere gas to be introduced from above and below the furnace with respect to the dew point of 65° C. ($P_{H2O}/P_{H2}$: 0.44) of the atmosphere gas as a basis so that the concentrations of the elements on the front and back surfaces of the steel sheet are constant after the decarburization annealing.

Next, a slurry of an annealing separator composed mainly of MgO and containing 0.5 mass % of Ca compound as converted to Ca, 3 mass % of $TiO_2$ and 3 mass % of strontium sulfate with respect to the whole annealing separator is applied onto the steel sheet surface and dried, and thereafter finish annealing is conducted by raising the temperature from room temperature to 1180° C. at a heating rate of 20° C./hr without the uniformizing heat treatment and holding to soak at a temperature of 1180° C. for 10 hours to perform purification. The atmosphere gas in the finish annealing is $H_2$ gas in the holding at 1180° C. for the purification and Ar gas in the temperature raising and falling other than the holding.

Samples are taken out from both widthwise end portions (upper and lower end portions of coil in finish annealing) and the central portion of the top end portion, central portion and tail end portion (inner portion, middle portion and outer portion of the coil in finish annealing) in the longitudinal direction of the thus-obtained steel sheet after the finish annealing, and the differences in concentrations of O, Si, Mg, Al, Mn, P, Ca and Ti between the front and back surfaces thereof are measured by a fluorescence X-ray analysis under conditions of voltage: 20 kV and current: 2 mA. The result shows that difference in each concentration is within the range according to aspects of the invention, i.e., the differences in concentrations of O, Si and Mg are each within ±5%, and the differences in concentrations of one or more of Al, Mn and P are each within ±15%, and the differences in concentrations of one or more of Ca and Ti are each within ±20%.

The samples are subjected to a stress-relief annealing at 800° C. for 2 hours like in Experiment 1, and then a bending and stripping diameter of the coating both on the front and back surfaces thereof is measured. The measurement values of the bending and stripping diameter on the surface having poorer coating adhesiveness are also shown in Table 5. As seen from Table 5, all of the steel sheets produced by using steel materials conforming to aspects of the invention under the conditions conforming to aspects of the invention have an excellent coating adhesiveness, irrespectively of the position in the coil during the finish annealing.

TABLE 5

| | | | | | | | | | Bending and stripping diameter (mm) | |
| | | | | | | | | | Outer coil portion | |
| | Chemical composition (mass %) | | | | | | | | Upper end | Middle |
| No | C | Si | Mn | Al | N | Se | S | Others | portion | portion |
| 1 | 0.035 | 3.25 | 0.23 | 0.007 | 0.003 | — | — | — | 20 | 20 |
| 2 | 0.078 | 4.31 | 0.09 | 0.004 | 0.004 | — | — | — | 30 | 20 |
| 3 | 0.065 | 3.50 | 0.08 | 0.035 | 0.008 | — | — | — | 20 | 25 |
| 4 | 0.073 | 3.42 | 0.08 | 0.022 | 0.010 | 0.023 | — | — | 30 | 20 |
| 5 | 0.058 | 3.25 | 0.06 | 0.023 | 0.008 | — | 0.025 | Nb: 0.009 | 20 | 20 |
| 6 | 0.068 | 3.42 | 0.09 | 0.020 | 0.008 | 0.022 | — | B: 0.0023 | 20 | 20 |
| 7 | 0.073 | 3.29 | 0.08 | 0.024 | 0.009 | 0.013 | — | Sb: 0.005, Te: 0.0095 | 25 | 25 |
| 8 | 0.075 | 3.37 | 0.08 | 0.025 | 0.008 | 0.020 | — | Sb: 0.007, Cu: 0.01, P: 0.005 | 30 | 20 |
| 9 | 0.071 | 3.31 | 0.07 | 0.021 | 0.007 | 0.025 | — | Ni: 0.015, Cr: 0.01, Sb: 0.180 | 20 | 20 |

TABLE 5-continued

| No | | | | | | | | | | |
|---|---|---|---|---|---|---|---|---|---|---|
| 10 | 0.073 | 3.50 | 0.07 | 0.025 | 0.008 | 0.013 | — | B: 0.0018, Nb: 0.001 | 20 | 25 |
| 11 | 0.067 | 3.23 | 0.10 | 0.025 | 0.004 | 0.023 | — | Sn: 0.006, V: 0.008 | 25 | 20 |
| 12 | 0.067 | 3.25 | 0.08 | 0.040 | 0.011 | — | — | Ti: 0.008, Ta: 0.009 | 25 | 25 |
| 13 | 0.035 | 3.31 | 0.03 | 0.006 | 0.008 | — | — | Bi: 0.005, Sn: 0.450 | 20 | 20 |
| 14 | 0.073 | 3.18 | 0.08 | 0.027 | 0.007 | 0.023 | — | Bi: 0.090, Mo: 0.006, Ti: 0.002 | 30 | 25 |
| 15 | 0.069 | 3.31 | 0.08 | 0.023 | 0.008 | 0.020 | 0.003 | Te: 0.0007, Nb: 0.008 | 20 | 20 |
| 16 | 0.071 | 3.23 | 0.07 | 0.018 | 0.006 | 0.021 | — | V: 0.002, Ta: 0.002 | 25 | 20 |
| 17 | 0.073 | 3.32 | 0.07 | 0.024 | 0.008 | 0.021 | — | P: 0.180, Mo: 0.070 | 20 | 20 |
| 18 | 0.067 | 3.44 | 0.07 | 0.021 | 0.007 | 0.018 | — | Cu: 0.40, Cr: 0.38 | 30 | 20 |
| 19 | 0.069 | 2.85 | 0.08 | 0.024 | 0.009 | 0.021 | — | B: 0.0004, Ni: 1.37 | 25 | 20 |
| 20 | 0.072 | 3.31 | 0.09 | 0.037 | 0.011 | 0.020 | — | Cu: 0.33, P: 0.240 | 20 | 20 |
| 21 | 0.071 | 3.23 | 0.08 | 0.024 | 0.008 | 0.020 | — | Sb: 0.230, Cr: 0.25 | 20 | 25 |
| 22 | 0.073 | 3.37 | 0.08 | 0.015 | 0.006 | 0.005 | — | Ta: 0.004, Ti: 0.008 | 30 | 20 |
| 23 | 0.065 | 3.32 | 0.03 | 0.006 | 0.003 | — | — | Nb: 0.008 | 25 | 25 |
| 24 | 0.057 | 3.32 | 0.07 | 0.013 | 0.007 | 0.005 | — | Sb: 0.25 | 20 | 20 |
| 25 | 0.063 | 3.45 | 0.08 | 0.018 | 0.009 | — | 0.004 | P: 0.07, Sb: 0.07 | 20 | 20 |

| | Bending and stripping diameter (mm) | | | | | | |
|---|---|---|---|---|---|---|---|
| | Outer coil portion | Middle coil portion | | | Inner coil portion | | |
| No | Lower end portion | Upper end portion | Middle portion | Lower end portion | Upper end portion | Middle portion | Lower end portion |
| 1 | 25 | 20 | 20 | 20 | 20 | 20 | 20 |
| 2 | 30 | 20 | 20 | 20 | 25 | 20 | 30 |
| 3 | 20 | 30 | 20 | 25 | 20 | 25 | 25 |
| 4 | 20 | 20 | 20 | 20 | 25 | 20 | 25 |
| 5 | 30 | 20 | 20 | 20 | 25 | 20 | 20 |
| 6 | 20 | 20 | 20 | 20 | 20 | 20 | 20 |
| 7 | 30 | 25 | 20 | 30 | 25 | 25 | 25 |
| 8 | 20 | 20 | 20 | 20 | 30 | 20 | 20 |
| 9 | 20 | 20 | 20 | 25 | 20 | 20 | 25 |
| 10 | 25 | 25 | 20 | 30 | 25 | 20 | 20 |
| 11 | 20 | 25 | 20 | 25 | 25 | 20 | 25 |
| 12 | 25 | 25 | 20 | 25 | 25 | 20 | 25 |
| 13 | 20 | 30 | 25 | 25 | 25 | 25 | 20 |
| 14 | 30 | 30 | 20 | 25 | 30 | 25 | 25 |
| 15 | 25 | 25 | 20 | 20 | 25 | 20 | 25 |
| 16 | 25 | 25 | 20 | 20 | 25 | 20 | 30 |
| 17 | 30 | 25 | 25 | 25 | 30 | 20 | 25 |
| 18 | 25 | 20 | 20 | 20 | 20 | 20 | 20 |
| 19 | 30 | 25 | 20 | 25 | 30 | 25 | 20 |
| 20 | 20 | 25 | 20 | 20 | 25 | 20 | 30 |
| 21 | 25 | 30 | 20 | 25 | 20 | 25 | 25 |
| 22 | 25 | 25 | 25 | 30 | 20 | 25 | 25 |
| 23 | 25 | 20 | 20 | 20 | 25 | 20 | 20 |
| 24 | 20 | 20 | 20 | 20 | 20 | 20 | 20 |
| 25 | 30 | 20 | 20 | 20 | 20 | 20 | 25 |

Example 2

A steel slab having a chemical composition comprising C: 0.060 mass %, Si: 3.25 mass %, Mn: 0.07 mass %, Al: 0.026 mass %, Se: 0.025 mass %, N: 0.009 mass %, Sb: 0.05 mass % and the remainder being Fe and inevitable impurities is produced by a continuous casting method, heated to 1390° C. and hot rolled to form a hot-rolled sheet having a sheet thickness of 2.0 mm. The hot-rolled sheet is then subjected to a hot-band annealing at 1030° C. for 10 seconds and further to two cold rollings having an intermediate annealing interposed therebetween at 1100° C. and 60 seconds to form a cold-rolled sheet having a final sheet thickness of 0.23 mm, and thereafter subjected to a decarburization annealing by heating from room temperature to 700° C. at a heating rate of 80° C./sec and holding to soak at a temperature of 850° C. for 120 seconds. The 0 concentration on the lower surface of the steel sheet after the annealing is measured online by a fluorescence X-ray at the outlet side of the annealing furnace, and the dew point of the atmosphere gas to be fed from above and below the annealing furnace to the inside of the furnace is adjusted based on the measurement values so that the dew point of the whole furnace is within 50° C.±2° C. after the decarburization annealing.

Then, samples are taken out from the top end portion, central portion and tail end portion in the longitudinal direction of the steel sheet after the decarburization annealing, and concentrations of O, Si, Al, Mn and P of both widthwise end portions (Op side, or operation side and Dr side, or drive side) and the widthwise central portion (Ce portion) on the front and back surfaces of the sample are analyzed by a fluorescence X-ray method under conditions of voltage: 20 kV and current: 2 mA to measure the difference in concentration of each element between the front and back surfaces. The measurement results are shown in Table 6. As seen from Table 6, it is possible to obtain a uniform oxide films being small in the differences in concentrations of O, Si, Al, Mn and P between the front and back surfaces by measuring the O concentration on the surface of the steel sheet after the decarburization annealing online and feeding back the measurement results to control the dew point of the atmosphere in the furnace during the soaking of the decarburization annealing.

Then, an insulation coating solution is applied to the surface of thus-obtained steel sheet after the finish annealing, after the removal of the unreacted annealing separator, and subjected to flattening annealing to obtain a product sheet. In this case, Mg is selected as a typical element for measuring a concentration of the steel sheet surface from an outlet side of the flattening annealing line, and analyzed by a fluorescence X-ray method under a condition of the voltage: 20 kV and current: 2 mA, whereby the Mg concentration on the front and back surfaces in the upper and lower end portions (both widthwise end portions) and widthwise central portion of the coil in the finish annealing is measured over the whole length of the coil to determine the difference in concentration between the front and back surfaces.

Table 7 shows the measurement results of the differences in concentrations on the front and back surfaces at the same positions as the positions where the samples have been taken out in Example 2. Moreover, product sheet samples are

TABLE 6

| | Difference R in concentration between front and back surfaces (%) | | | | | | | | |
|---|---|---|---|---|---|---|---|---|---|
| | Top end portion of coil | | | Central portion of coil | | | Tail end portion of coil | | |
| | Op side | Ce portion | Dr side | Op side | Ce portion | Dr side | Op side | Ce portion | Dr side |
| O | −2.5 | −2.4 | −3.3 | −2.8 | −2.6 | −2.6 | −2.3 | −3.2 | −3.1 |
| Si | −2.1 | −2.3 | −2.7 | −2.3 | −2.2 | −2.2 | −1.5 | −2.4 | −2.6 |
| Al | 3.0 | 3.4 | 3.6 | 3.2 | 3.2 | 3.2 | 3.3 | 3.5 | 3.5 |
| Mn | −2.8 | −2.5 | −2.4 | −2.5 | −2.6 | −2.3 | −2.5 | −2.6 | −2.1 |
| P | −2.3 | −2.4 | −2.5 | −2.4 | −2.3 | −2.0 | −2.5 | −2.6 | −2.6 |

Example 3

A slurry of an annealing separator comprising 0.6 mass % of calcium hydroxide as converted to Ca, 8 mass % of titanium oxide, 4 mass % of strontium sulfate, 4 mass % of tin oxide and the remainder being MgO is applied to the steel sheet after the decarburization annealing produced in Example 2, and dried. Thereafter, the sheet is a finish annealing under two conditions: one condition is that the sheet is subjected to uniformizing heat treatment at 840° C. for 50 hours and further to purification by heating to 1210° C. at 10° C./hr and holding to soak at 1210° C. for 10 hours; the other is that the sheet is subjected to a purification by heating to 1210° C. at 10° C./hr and holding to soak at 1210° C. for 10 hours without the uniformizing heat treatment. The atmosphere gas in the uniformizing heat treatment and the finish annealing is $H_2$ gas in the holding of 1210° C. for the purification and Ar gas in uniformizing heat treatment and the temperature raising and falling during the finish annealing other than above.

taken out from the same positions as those where the sample have been taken out in Example 2 and subjected to a stress-relief annealing at 800° C. for 2 hours. The bending and stripping diameters of the resulting coatings are measured and the measurement results are also shown in Table 7.

Table 7 shows that the good coating adhesiveness is obtained over the whole length and width of the product sheet coil, not only at the top end portion of the outer portion of the coil in the finish annealing. In particular, the coating adhesiveness is more excellent when the uniformizing heat treatment is conducted before the finish annealing.

TABLE 7

| | | Top end portion of coil | | | Middle portion of coil | | | Tail end portion of coil | | |
|---|---|---|---|---|---|---|---|---|---|---|
| | | Op side | Ce portion | Dr side | Op side | Ce portion | Dr side | Op side | Ce portion | Dr side |
| Uniformizing heat treatment conducted | Difference R in Mg concentration on front and back surface (%) | 2.4 | 2.5 | 2.6 | 2.2 | 2.3 | 2.5 | 2.6 | 2.5 | 2.5 |
| | Bending and stripping diameter (mm) | 20 | 20 | 25 | 20 | 20 | 20 | 25 | 25 | 20 |
| No uniformizing heat treatment conducted | Difference R in Mg concentration on front and back surface (%) | 3.2 | 3.1 | 3.3 | 3.1 | 2.9 | 3.0 | 2.9 | 2.9 | 3.2 |
| | Bending and stripping diameter (mm) | 30 | 25 | 30 | 30 | 25 | 25 | 30 | 25 | 30 |

Example 4

A steel slab having a chemical composition comprising C: 0.050 mass %, Si: 3.2 mass %, Mn: 0.07 mass %, Al: 0.007 mass %, Se: 0.005 mass %, P: 0.03 mass %, N: 0.004 mass %, Sb: 0.05 mass % and the remainder being Fe and inevitable impurities is produced by a continuous casting method, heated to 1300° C. and hot rolled to form a hot-rolled sheet having a sheet thickness of 2.0 mm. The hot-rolled sheet is subjected to a primary cold rolling to have a middle sheet thickness of 1.3 mm, an intermediate annealing at 1000° C. for 10 seconds, and a secondary cold rolling to form two coils of a cold-rolled sheet each having a sheet thickness of 0.23 mm.

As to one coil of the cold-rolled sheet, the front and back surfaces of the steel sheet are pickled with an aqueous solution of 3 mass % HCl at 50° C. for 3 seconds, and are subjected to a brushing with a brush containing #200 abrasive grains to uniformize surface qualities of the front and back surfaces, while, as to the other coil, neither the above pickling nor brushing is conducted.

Incidentally, the residual oxide and surface roughness on the front and back surfaces of the two coils are measured by a fluorescence X-ray analyzer and a roughness gauge to determine the difference in measurement values between the front and back surfaces. Both differences in the residual oxide and the surface roughness between the front and back surfaces (front surface–back surface) of the coil subjected to the pickling and brushing fall within ±5% with respect to each average value. Although the difference in the surface roughness between the front and back surface of the coil not subjected to the pickling and brushing falls within ±5% with respect to the average value, the amount of the residual oxide adhered to the front surface is 18% larger than the average value in the front and back surfaces.

Next, the cold-rolled sheet is subjected to a decarburization annealing combined with a primary recrystallization annealing by heating from room temperature to 700° C. at a heating rate of 80° C./sec and holding to soak at a temperature of 800° C. for 120 seconds. In this treatment, the dew point of the atmosphere gas in the annealing furnace to be fed from above and below the annealing furnace is adjusted so that the dew point of the atmosphere falls in a range of 50±2° C. throughout the furnace in the decarburization annealing.

Next, samples are taken out from the top end portion, central portion and tail end portion in the longitudinal direction of the steel sheet after the decarburization annealing, and concentrations of O, Si, Al, Mn and P at the both widthwise end portions (Op side, Dr side) and widthwise central portion (Ce portion) on the front and back surfaces of each sample are analyzed by a fluorescence X-ray method under a condition of voltage: 20 kV and current: 2 mA to determine the difference R in concentration of each element between the front and back surfaces. The measurement results are shown in Table 8.

A slurry of an annealing separator comprising 0.5 mass % of calcium hydroxide as converted to Ca, 5 mass % of titanium oxide, 3 mass % of tin oxide and the remainder being MgO is applied to the steel sheet after the decarburization annealing and dried. The steel sheet is then subjected to a finish annealing by heating to 1210° C. at 10° C./hr and holding to soak at a temperature of 1210° C. for 10 hours for purification, without uniformizing heat treatment. The atmosphere gas in the finish annealing is H2 gas in the holding of 1210° C. for the purification, and Ar gas in the temperature raising and falling other than the above.

Next, the steel sheet after the finish annealing is coated with an insulation coating liquid after the removal of the unreacted annealing separator and subjected to a flattening annealing to form a product sheet. Samples are taken out from the top end portion, central portion and tail end portion in the longitudinal direction of the sheet like in the case of the steel sheet after the decarburization annealing, and concentrations of O, Si, Mg, Al, Mn, P, Ca and Ti at both widthwise end portions (Op side, Dr side) and widthwise central portion (Ce side) on the front and back surfaces of each sample are analyzed by an X-ray fluorescence method under a condition of voltage: 20 kV and current: 2 mA to determine a difference R in concentration of each element between the front and back surfaces. The measurement results are shown in Table 9. Moreover, samples of the product sheet are taken out from the same positions as the positions where the above samples have been taken out, and subjected to stress-relief annealing at 800° C. for 2 hours. The bending and stripping diameters of the resulting coatings are measured and the measured results are also shown in this Table 9.

TABLE 8

| | | Difference R in concentration on front and back surface (%) | | | | | | | | |
|---|---|---|---|---|---|---|---|---|---|---|
| | | Top end portion of coil | | | Middle portion of coil | | | Tail end portion of coil | | |
| | | Op side | Ce portion | Dr side | Op side | Ce portion | Dr side | Op side | Ce portion | Dr side |
| Pickling and brushing conducted | O | −1.8 | −2.2 | −2.6 | −2.3 | −2.6 | −2.0 | −1.5 | −2.4 | −2.6 |
| | Si | −1.8 | −2.2 | −2.0 | −1.5 | −1.2 | −2.1 | −2.0 | −1.9 | −1.8 |
| | Al | 2.7 | 2.8 | 2.7 | 2.6 | 2.4 | 2.6 | 2.5 | 1.9 | 2.8 |
| | Mn | −2.5 | −2.3 | −1.8 | −1.7 | −1.6 | −1.5 | −1.9 | −2.3 | −1.6 |
| | P | −1.9 | −1.6 | −1.7 | −1.6 | −1.9 | −2.1 | −2.1 | −1.5 | −1.7 |
| Neither pickling nor blushing conducted | O | 12.5 | 12.0 | 16.6 | 14.8 | 13.3 | 13.1 | 11.8 | 15.9 | 15.4 |
| | Si | 12.2 | 10.3 | 19.6 | 13.8 | 13.8 | 11.7 | 10.1 | 18.1 | 14.2 |
| | Al | −6.4 | −6.2 | −7.3 | −5.9 | −6.4 | −6.2 | −5.8 | −7.3 | −7.1 |
| | Mn | 6.4 | 5.6 | 8.1 | 7.1 | 6.6 | 6.2 | 5.3 | 9.2 | 8.3 |
| | P | 8.0 | 7.3 | 9.6 | 8.2 | 7.7 | 8.2 | 9.1 | 9.7 | 9.2 |

TABLE 9

|  |  |  | Top end portion of coil | | | Middle portion of coil | | | Tail end portion of coil | | |
| --- | --- | --- | --- | --- | --- | --- | --- | --- | --- | --- | --- |
|  |  |  | Op side | Ce portion | Dr side | Op side | Ce portion | Dr side | Op side | Ce portion | Dr side |
| Pickling and brushing conducted | Difference R in concentration on front and back surface (%) | O | −1.9 | −2.0 | −2.3 | −1.8 | −1.5 | −1.7 | −2.5 | −1.9 | −1.8 |
|  |  | Si | −1.6 | −2.1 | −1.4 | −1.6 | −2.2 | −1.8 | −2.2 | −1.6 | −1.7 |
|  |  | Mg | 1.5 | 1.9 | 2.0 | 1.8 | 2.0 | 1.8 | 2.1 | 1.8 | 1.7 |
|  |  | Al | −5.1 | −4.0 | −4.2 | −4.5 | −5.1 | −5.1 | −4.8 | −4.3 | −3.8 |
|  |  | Mn | 3.8 | 5.1 | 4.9 | 2.6 | 3.0 | 4.6 | 3.2 | 3.3 | 4.2 |
|  |  | P | 4.6 | 5.6 | 4.9 | 6.5 | 3.9 | 5.5 | 4.4 | 6.7 | 5.6 |
|  |  | Ca | 6.2 | 5.3 | 5.3 | 5.9 | 6.4 | 5.7 | 4.3 | 6.7 | 5.8 |
|  |  | Ti | 6.6 | 7.2 | 10.2 | 7.3 | 5.6 | 7.2 | 8.2 | 8.3 | 9.0 |
|  | Bending and stripping diameter (mm) | | 25 | 20 | 20 | 20 | 20 | 20 | 25 | 20 | 20 |
| Neither pickling nor brushing conducted | Difference R in concentration on front and back surface (%) | O | 13.3 | 13.1 | 15.9 | 12.8 | 12.2 | 14.6 | 11.8 | 15.3 | 16.6 |
|  |  | Si | 13.1 | 12.5 | 19.3 | 14.1 | 15.4 | 15.8 | 11.3 | 17.5 | 16.4 |
|  |  | Mg | −11.0 | −12.8 | −18.4 | −13.7 | −13.3 | −16.8 | −10.7 | −17.9 | −16.9 |
|  |  | Al | 9.1 | 9.5 | 12.9 | 10.5 | 9.6 | 11.2 | 10.3 | 11.8 | 12.1 |
|  |  | Mn | −10.6 | −11.8 | −17.1 | −12.3 | −13.8 | −14.0 | −9.9 | −16.9 | −15.3 |
|  |  | P | −18.1 | −19.3 | −24.6 | −20.9 | −22.5 | −23.1 | −20.8 | −25.1 | −26.0 |
|  |  | Ca | −24.5 | −25.8 | −30.1 | −27.6 | −28.2 | −29.8 | −25.3 | −26.1 | −26.3 |
|  |  | Ti | −30.2 | −29.4 | −36.6 | −31.3 | −32.1 | −33.9 | −28.5 | −34.6 | −34.0 |
|  | Bending and stripping diameter (mm) | | 45 | 45 | 55 | 50 | 50 | 45 | 45 | 50 | 50 |

As seen from the results of Tables 8 and 9, when the uniformizing treatment for the surface quality is conducted after the cold rolling and before the decarburization annealing in consideration of a bad influence due to the difference in quality between the front and back surfaces of the steel sheet before the decarburization annealing, there is obtained an uniform oxide film having a small difference each in O, Si, Al, Mn and P concentration between the front and back surfaces of the steel sheet after the decarburization annealing, and hence the difference in concentration of each of O, Si, Mg, Al, Mn, P, Ca and Ti between the front and back surfaces of the steel sheet after the finish annealing decreases, i.e., the underlaying coating in the product sheet becomes uniform on the front and back surfaces to provide an excellent coating adhesiveness.

The invention claimed is:

1. A grain-oriented electrical steel sheet having a ceramic underlaying coating on the steel sheet surface, characterized in that differences in concentrations of O, Si, Mg, Al, Mn, P, Ca and Ti between the front and back surfaces of the underlaying coating satisfies the following conditions (1), (2) and (3) with respect to each average concentration between the front and back surfaces:

(1) each of O, Si and Mg: within ±5%, (2) one or more of Al, Mn and P: within ±15%, (3) one or more of Ca and Ti: within ±20%.

* * * * *